(12) United States Patent
Branson et al.

(10) Patent No.: US 8,954,723 B2
(45) Date of Patent: Feb. 10, 2015

(54) ANONYMIZATION OF DATA WITHIN A STREAMS ENVIRONMENT

(75) Inventors: Michael J. Branson, Rochester, MN (US); Ryan K. Cradick, Oronoco, MN (US); John M. Santosuosso, Rochester, MN (US); Brandon W. Schulz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 13/467,593

(22) Filed: May 9, 2012

(65) Prior Publication Data

US 2013/0305032 A1    Nov. 14, 2013

(51) Int. Cl.
*H04L 29/06* (2006.01)
*H04L 9/00* (2006.01)

(52) U.S. Cl.
CPC .................................... *H04L 9/008* (2013.01)
USPC ......................................................... 713/150

(58) Field of Classification Search
CPC ....................................................... H04L 9/08
USPC ......................................... 713/150, 161, 168
See application file for complete search history.

(56) References Cited

U.S. PATENT DOCUMENTS

| | | | |
|---|---|---|---|
| 6,611,869 B1 | 8/2003 | Eschelbeck et al. | |
| 6,628,786 B1 | 9/2003 | Dole | |
| 7,362,772 B1 | 4/2008 | Alfieri et al. | |
| 7,372,379 B1* | 5/2008 | Jia et al. | 341/67 |
| 7,426,745 B2 | 9/2008 | McCarty | |
| 7,571,199 B1 | 8/2009 | Field et al. | |
| 7,685,437 B2 | 3/2010 | Hacigumus et al. | |
| 7,783,900 B2 | 8/2010 | Hacigumus et al. | |
| 7,930,332 B2 | 4/2011 | Acar et al. | |
| 8,019,802 B2 | 9/2011 | Rose et al. | |
| 2003/0051026 A1 | 3/2003 | Carter et al. | |
| 2005/0286719 A1 | 12/2005 | Kemp | |
| 2006/0062384 A1 | 3/2006 | Dondeti | |
| 2007/0150441 A1 | 6/2007 | Morris | |
| 2008/0005392 A1* | 1/2008 | Amini et al. | 710/29 |
| 2008/0263117 A1 | 10/2008 | Rose et al. | |
| 2010/0106756 A1 | 4/2010 | Ellison | |
| 2010/0306296 A1 | 12/2010 | Inglett et al. | |
| 2011/0047545 A1 | 2/2011 | Ellison et al. | |
| 2013/0305034 A1 | 11/2013 | Branson et al. | |

* cited by examiner

*Primary Examiner* — Anthony Brown
(74) *Attorney, Agent, or Firm* — Patterson & Sheridan LLP

(57) ABSTRACT

Streams applications may decrypt encrypted data even though the decrypted data is not used by an operator. Operator properties are defined to permit decryption of data within the operator based on a number of criteria. By limiting the number of operators that decrypt encrypted data, the anonymous nature of the data is further preserved. Operator properties also indicate whether an operator should send encrypted or decrypted data to a downstream operator.

14 Claims, 8 Drawing Sheets

ANONYMIZATION OF DATA WITHIN A STREAMS ENVIRONMENT

BACKGROUND

Embodiments of the present disclosure generally relate to stream computing applications using streaming data. Specifically, the embodiments disclose techniques for processing encrypted data within streams computing applications that use streaming data.

SUMMARY

Embodiments disclosed herein provide a method, system and computer program product for performing an operation, the operation including providing a plurality of processing elements comprising one or more operators, the operators configured to process streaming data tuples. The operation then defines attributes of the operators, the attributes including at least an access indicator, the access indicator defining processing rules for tuples containing encrypted data. The operation then establishes an operator graph of multiple operators, the operator graph defining at least one execution path in which a first operator of the plurality of operators is configured to receive data tuples from at least one upstream operator and transmit data tuples to at least one downstream operator. The operation then, upon receiving a first data stream containing a first tuple containing encrypted data in the first operator, determines, based on the access indicator of the first operator, whether to decrypt the encrypted data in the first operator. The operation, upon determining that the access indicator of the first operator permits decryption of the encrypted data, decrypts the encrypted data. The operation, upon determining that the access indicator of the first operator does not permit decryption of the encrypted data, does not decrypt the encrypted data. The operation then transmits the tuple to a second operator, downstream from the first operator.

An application may decrypt encrypted data even if the application is not going to perform any operations on the decrypted data. In streams programming and data mining applications, the data in its associated data record, or its associated tuple in the case of streams programming, is the information needed to process the data. For example, it is not necessary to see social security numbers when trying to determine which gender is more susceptible to a given medical condition. It is also not necessary to view a customer's credit card information when determining the average number of products purchased in a single customer transaction. Additionally, it is not necessary to expose information identifying a customer's bank account when identifying the bank or automated teller machine the customer uses the most frequently.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1A:
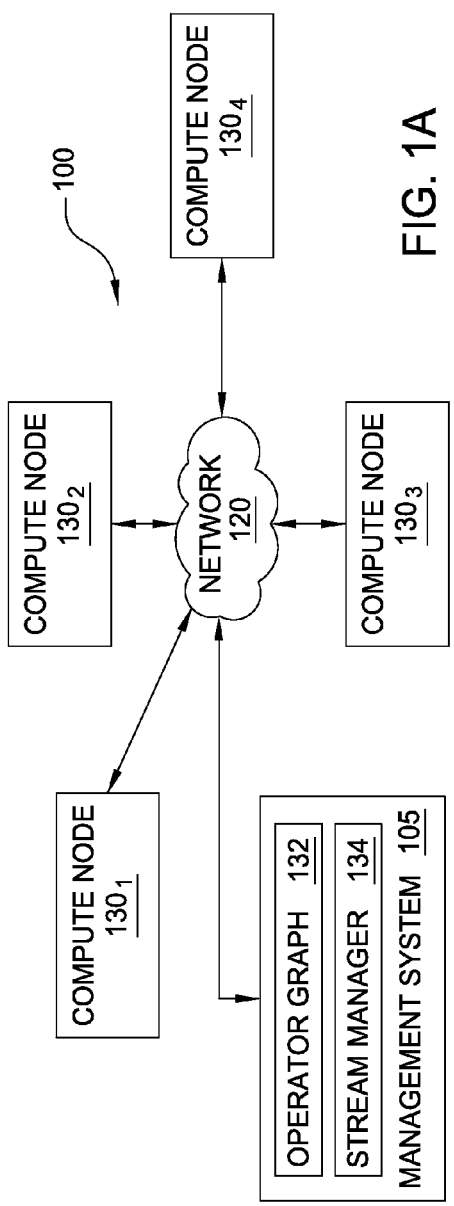
FIGS. 1A-1B illustrate a computing infrastructure configured to execute a stream computing application, according to embodiments disclosed herein.

Embodiments disclosed herein provide a method, system and computer program product for performing an operation, the operation including providing a plurality of processing elements comprising one or more operators, the operators configured to process streaming data tuples. The operation then defines attributes of the operators, the attributes including at least an access indicator, the access indicator defining processing rules for tuples containing encrypted data. The operation then establishes an operator graph of multiple operators, the operator graph defining at least one execution path in which a first operator of the plurality of operators is configured to receive data tuples from at least one upstream operator and transmit data tuples to at least one downstream operator. The operation then, upon receiving a first data stream containing a first tuple containing encrypted data in the first operator, determines, based on the access indicator of the first operator, whether to decrypt the encrypted data in the first operator. The operation, upon determining that the access indicator of the first operator permits decryption of the encrypted data, decrypts the encrypted data. The operation, upon determining that the access indicator of the first operator does not permit decryption of the encrypted data, does not decrypt the data. The operation then transmits the tuple to a second operator, downstream from the first operator.

Most applications need access to data and then act upon that data. Due to many regulations in different industries, some of the data that applications traditionally access now needs to be either stored separately from data with which it traditionally resides, or encrypted such that upon accessing the data, keys or some methodology is needed to unlock the underlying data. Many forms of data, such as social security numbers, can no longer be stored in traditional database tables without having substantial protection methods in place for accessing the data.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream computing application, operators are connected to one another such that data flows from one operator to the next (e.g., over a TCP/IP socket). Scalability is reached by distributing an application across nodes by creating executables (i.e., processing elements), as well as replicating processing elements on multiple nodes and load balancing among them. Operators in a stream computing application can be fused together to form a processing element that is executable. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream computing application.

In streams programming, data is sent in all directions through operator graphs. Many operators are granular in nature and perform specific tasks. Some operators may or may not require access to all of the encrypted data, or in some cases, they require access to encrypted data, but the data they generate is not encrypted.

Embodiments described herein disclose a set of mechanisms that allow streams programming to operate as efficiently as possible on encrypted data. Operator properties are set for given tuple attributes, or the attributes are set on the tuple itself to decide how to handle encrypted data. Embodiments described herein disclose decrypting data inside the operator itself, meaning the data may be shipped to another node to perform the decryption, or the operator and the state of the operator may be moved to a given node to perform the decryption.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Figure 1B:
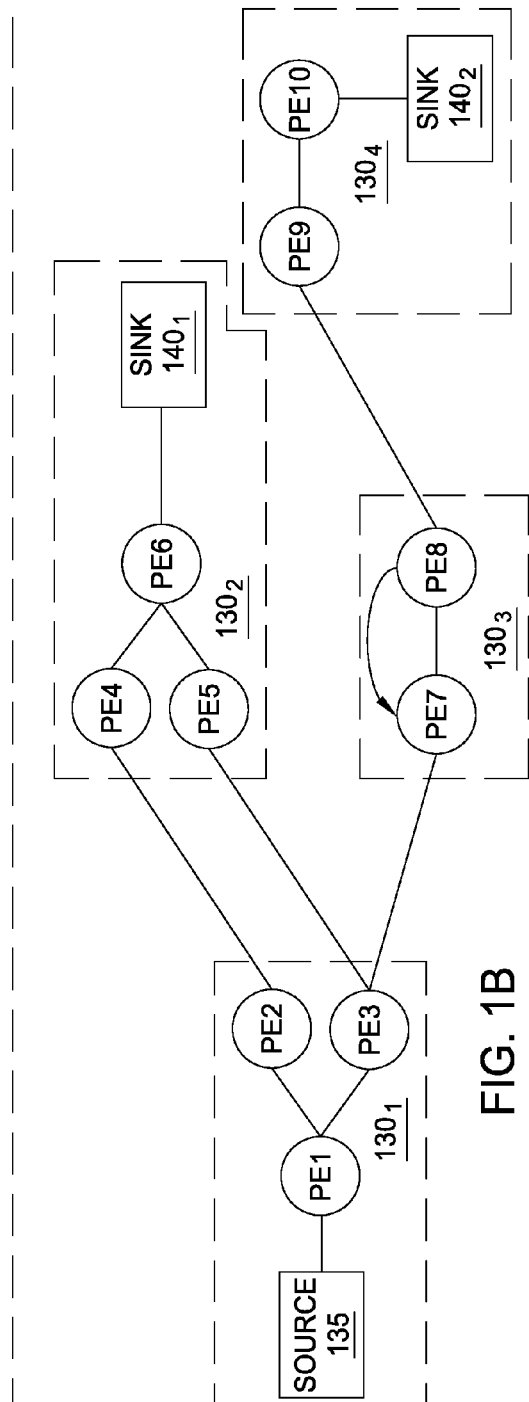

FIGS. 1A-1B illustrate a computing infrastructure configured to execute a stream computing application, according to one embodiment of the disclosure. As shown, the computing infrastructure 100 includes a management system 105 and a plurality of compute nodes $130_{1-4}$, each connected to a communications network 120. Also, the management system 105 includes an operator graph 132 and a stream manager 134. As described in greater detail below, the operator graph 132 represents a stream computing application beginning from one or more operators in one or more source processing elements (PEs) through to one or more operators in one or more sink PEs. This flow from source to sink is also generally referred to herein as an execution path. Generally, data attributes flow into an operator of a source PE of a stream computing application and are processed by that operator. Typically, operators receive an N-tuple of data attributes from the stream as well as emit an N-tuple of data attributes into the stream (except for operators in a sink PE where the stream terminates).

In general, a "tuple" is a single instance of a set of data attributes that follow the formatting of a schema, where the schema establishes a set of typed data attributes that may be used. For example, the tuple may be a chunk or portion of divisible data such as a data type (e.g., string, integer, Boolean, etc.) or combination of data types. In one embodiment, a "tuple" may include one or more attributes with an assigned value—e.g., Tuple 1: {sym="Fe", no=26} where "sym" and "no" are possible attributes in the schema (i.e., a string and integer, respectively) and "Fe" and "26" are the values. In one embodiment, one or more attributes of a data tuple may be encrypted. However, not all operators have the correct keys and mechanisms to decrypt data tuples. Based on the access indicators of the operators, the operator may or may not be able to decrypt data tuples.

Of course, the N-tuple received by an operator need not be the same N-tuple sent downstream. Additionally, operators could be configured to receive or emit tuples in other formats (e.g., the PEs or operators could exchange data marked up as XML documents). Based on policies and operator access indicators, operators that have decrypted data tuples may reencrypt the decrypted data tuples before sending them downstream, or may emit the decrypted data tuples. Furthermore, each operator within a PE may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream computing application running on the compute nodes $130_{1-4}$, as well as to change the deployment of the operator graph 132. The stream manager 134 may move processing elements (PEs) from one compute node 130 to another, for example, to manage the processing loads of the compute nodes 130 in the computing infrastructure 100. Further, stream manager 134 may control the stream computing application by inserting, removing, fusing, un-fusing, or otherwise modifying the processing elements and operators (or what data tuples flow to the processing elements and operators) running on the compute nodes $130_{1-4}$. One example of a stream computing application is IBM®'s InfoSphere® Streams (InfoSphere® is a trademark of International Business Machines Corporation, registered in many jurisdictions worldwide).

FIG. 1B illustrates an example processing element graph that includes ten processing elements (labeled as PE1-PE10) running on the compute nodes $130_{1-4}$. A processing element is composed of one or more operators fused together into an independently running process with its own process ID (PID) and memory space. In cases where two (or more) processing elements are running independently, inter-process communication may occur using a "transport" (e.g., a network socket, a TCP/IP socket, or shared memory). However, when operators are fused together, the fused operators can use more rapid communication techniques for passing tuples among operators in each processing element.

As shown, the processing element graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into operators in the processing element PE1, which in turn emits tuples that are received by PE2 and PE3. For example, operators in PE1 may split data attributes received in a tuple and pass some data attributes to PE2, while passing other data attributes to PE3. Data that flows to PE2 is processed by the operators contained in PE2, and the resulting tuples are then emitted to the operators in PE4 on compute node $130_2$. Likewise, the data tuples emitted by the operators in PE4 flow to the operators sink PE6 $140_1$. Similarly, data tuples flowing from operators in PE3 to operators in PE5 also reach operators in sink PE6 $140_1$. Thus, in addition to being a sink for this example processing element graph, operators in PE6 could be configured to perform a join operation, combining tuples received from operators in PE4 and PE5. This example processing element graph also shows data tuples flowing from PE3 to PE7 on compute node $130_3$, which itself shows data tuples flowing to operators in PE8 and looping back to operators in PE7. Data tuples emitted from operators in PE8 flow to operators in PE9 on compute node $130_4$, which in turn emits tuples to be processed by operators in sink PE10 $140_2$.

Because a processing element is a collection of fused operators, it is equally correct to describe the operator graph as execution paths between specific operators, which may include execution paths to different operators within the same processing element. FIG. 1B illustrates execution paths between processing elements for the sake of clarity.

In one embodiment, the stream manger 134 may be able to communicate with other operator graphs executing in a stream computing application. That is, the compute nodes 130 may host operator graphs executing in parallel. The stream manager 134 may be able to communicate with a stream manager associated with those parallel operator graphs using, for example, a shared memory where messages and commands may be passed. Alternatively, stream manager 134 may be part of a hierarchical arrangement of stream managers that allow the different stream managers to communicate. The stream manager 134 may use the manager hierarchy or the shared memory to instruct a different stream manager to optimize an operator graph in the stream computing application that is sharing the same compute nodes 130 (i.e., hardware resources) as the operator graph shown in FIG. 1B. Additionally, the hierarchical arrangement may manage stream managers across different compute nodes, for example, a first stream manager 134 for a first stream computing application owned by a first customer and a second stream manager 134 for a second stream computing application owned by a second customer.

Figure 2:
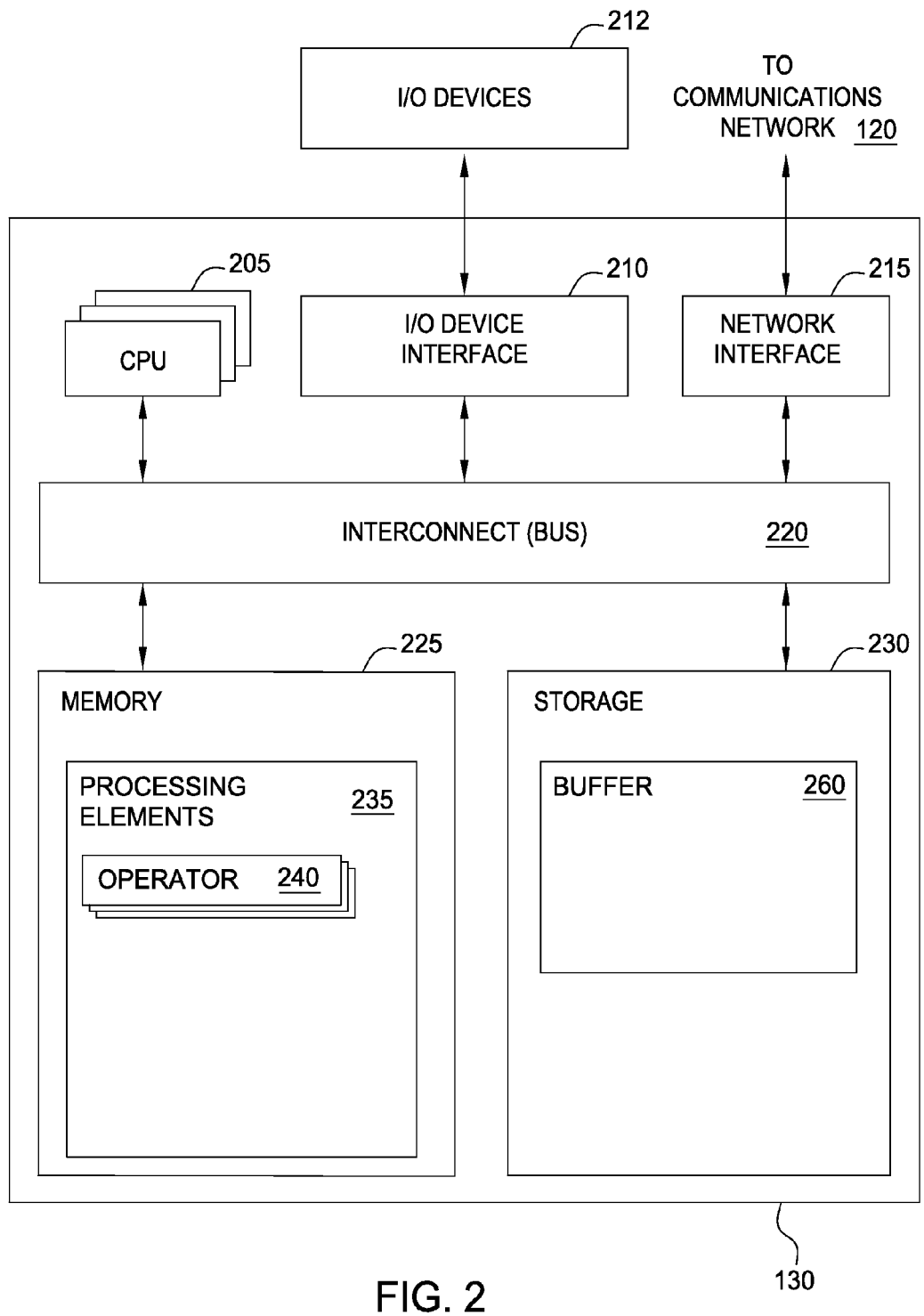
FIG. 2 is a more detailed view of the compute node of FIGS. 1A-1B, according to one embodiment disclosed herein.

FIG. 2 is a more detailed view of the compute node 130 of FIGS. 1A-1B, according to one embodiment disclosed herein. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. In one embodiment, a PE 235 is assigned to be executed by only one CPU 205 although in other embodiments the operators 240 of a PE 235 may comprise one or more threads that are executed on a plurality of CPUs 205. The memory 225 is generally included to be representative of a random access memory (e.g., DRAM or Flash). Storage 230, such as a hard disk drive, solid state device (SSD), or flash memory storage drive, may store non-volatile data.

In this example, the memory 225 includes a plurality of processing elements 235. Each PE 235 includes a collection of operators 240 that are fused together. As noted above, each operator 240 may provide a small chunk of code configured to process data flowing into a processing element (e.g., PE 235) and to emit data to other operators 240 in the same PE or to other PEs in the stream computing application. Such processing elements may be on the same compute node 130 or on other compute nodes that are accessible via communications network 120.

As shown, storage 230 contains a buffer 260. Although shown as being in storage, the buffer 260 may be located in the memory 225 of the compute node 130 or a combination of both. Moreover, storage 230 may include storage space that is external to the compute node 130.

Figure 3:
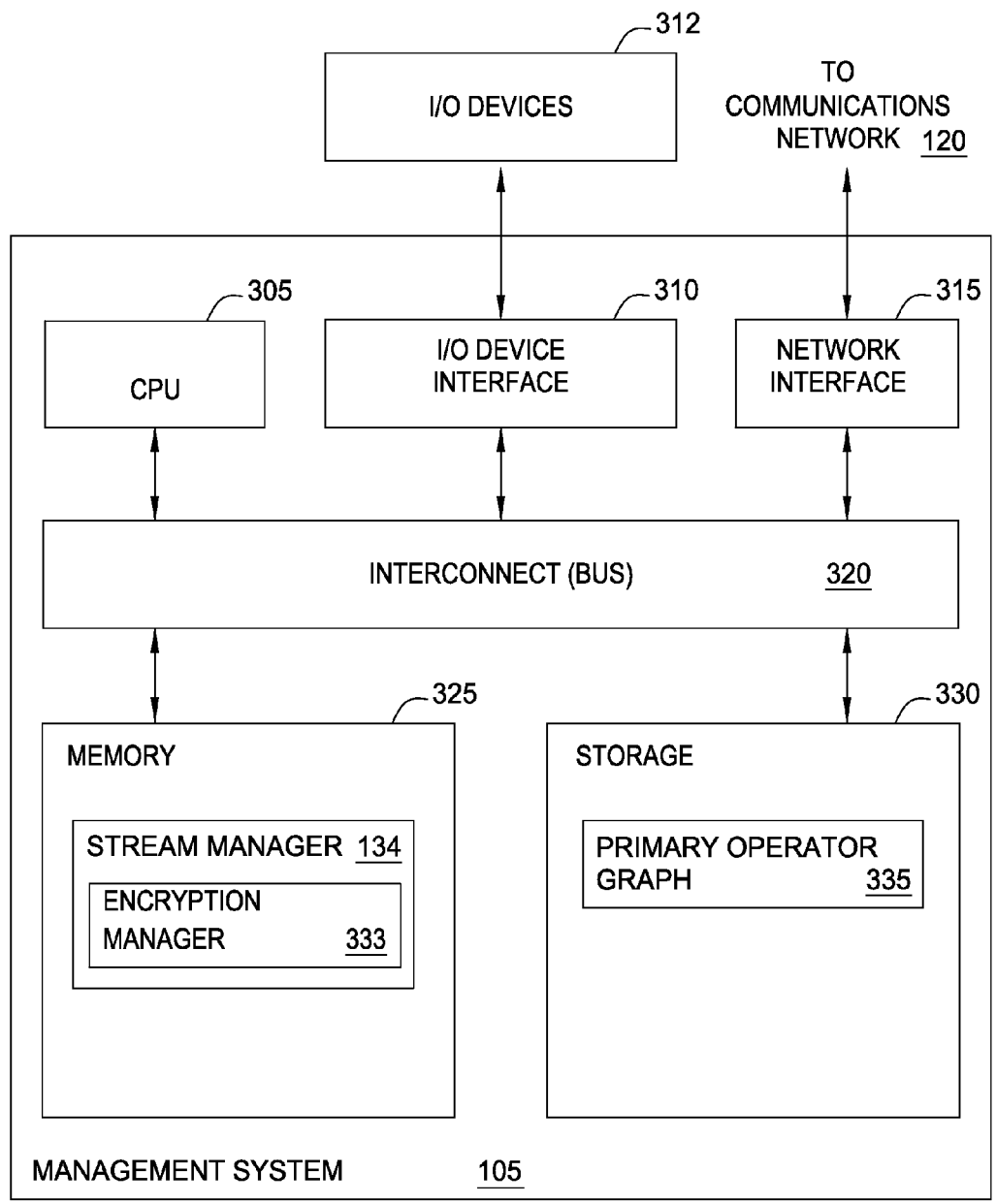
FIG. 3 is a more detailed view of the server management system of FIGS. 1A-1B, according to one embodiment disclosed herein.

FIG. 3 is a more detailed view of the server management system 105 of FIG. 1, according to one embodiment disclosed herein. As shown, server management system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. Additionally, the storage 330 includes a primary operator graph 132. The stream manager 134 may use the primary operator graph 132 to route tuples to PEs 235 for processing. The stream manager 134 also includes encryption manager 333 for processing encrypted data tuples. In some embodiments, the encryption manager 333 defines properties of an operator which controls whether the operator will decrypt encrypted data, and whether encrypted or decrypted data will be output to a downstream operator. In some embodiments, the encryption manager 333 may define the operator properties at compilation. In some other embodiments, the encryption manager 333 tags specific data tuples with attributes indicating whether the data should be decrypted, and whether it should be output to a downstream operator in an encrypted or decrypted format. The operator properties and tuple attributes may be set and stored in any manner sufficient to indicate whether an operator is permitted to decrypt encrypted tuples, including, but not limited to, Boolean values and integer values corresponding to levels of permission.

Figure 4:
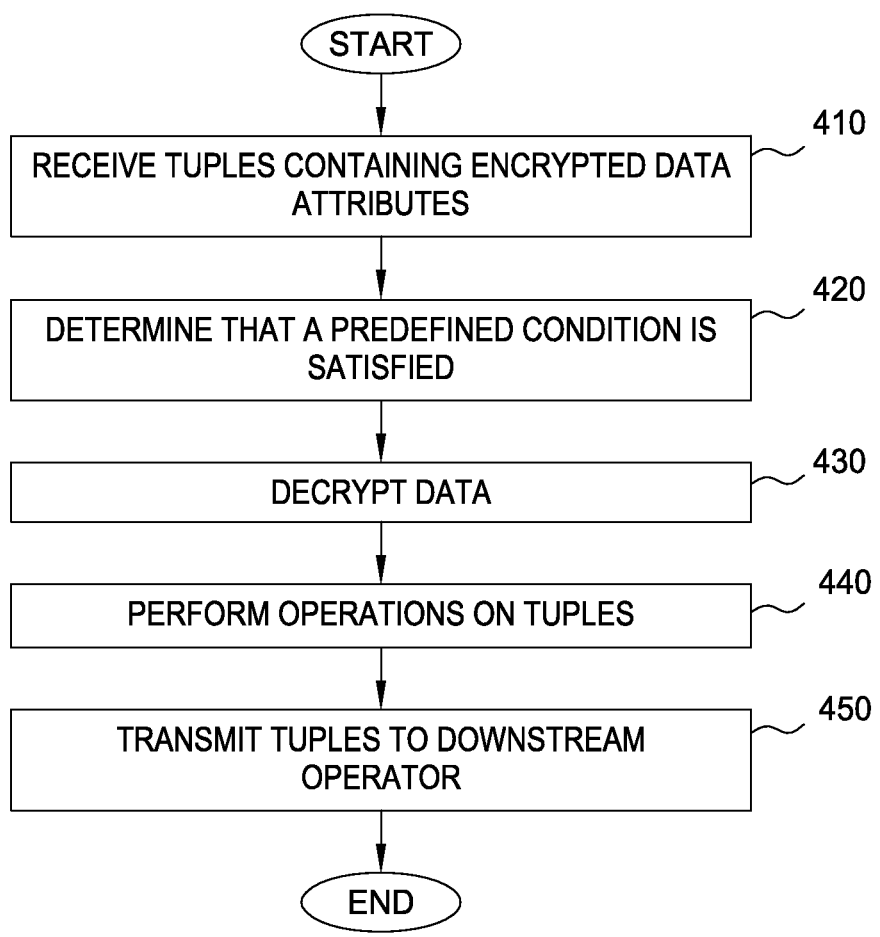
FIG. 4 is a flowchart depicting a method for processing encrypted data, according to one embodiment disclosed herein.

FIG. 4 is a flowchart depicting a method 400 for processing encrypted data, according to one embodiment disclosed herein. At step 410, an operator receives data tuples containing encrypted data attributes. At step 420, described in greater detail with reference to FIG. 5, the encryption manager 333 determines that a predetermined condition is satisfied such that encrypted attributes within the data tuples may be decrypted. At step 430, described in greater detail with reference to FIG. 6, the encryption manager 333 decrypts the encrypted data. At step 440, the operator performs operations on the tuples. At step 450, described in greater detail with reference to FIG. 7, the tuples are transmitted to a downstream operator.

Figure 5:
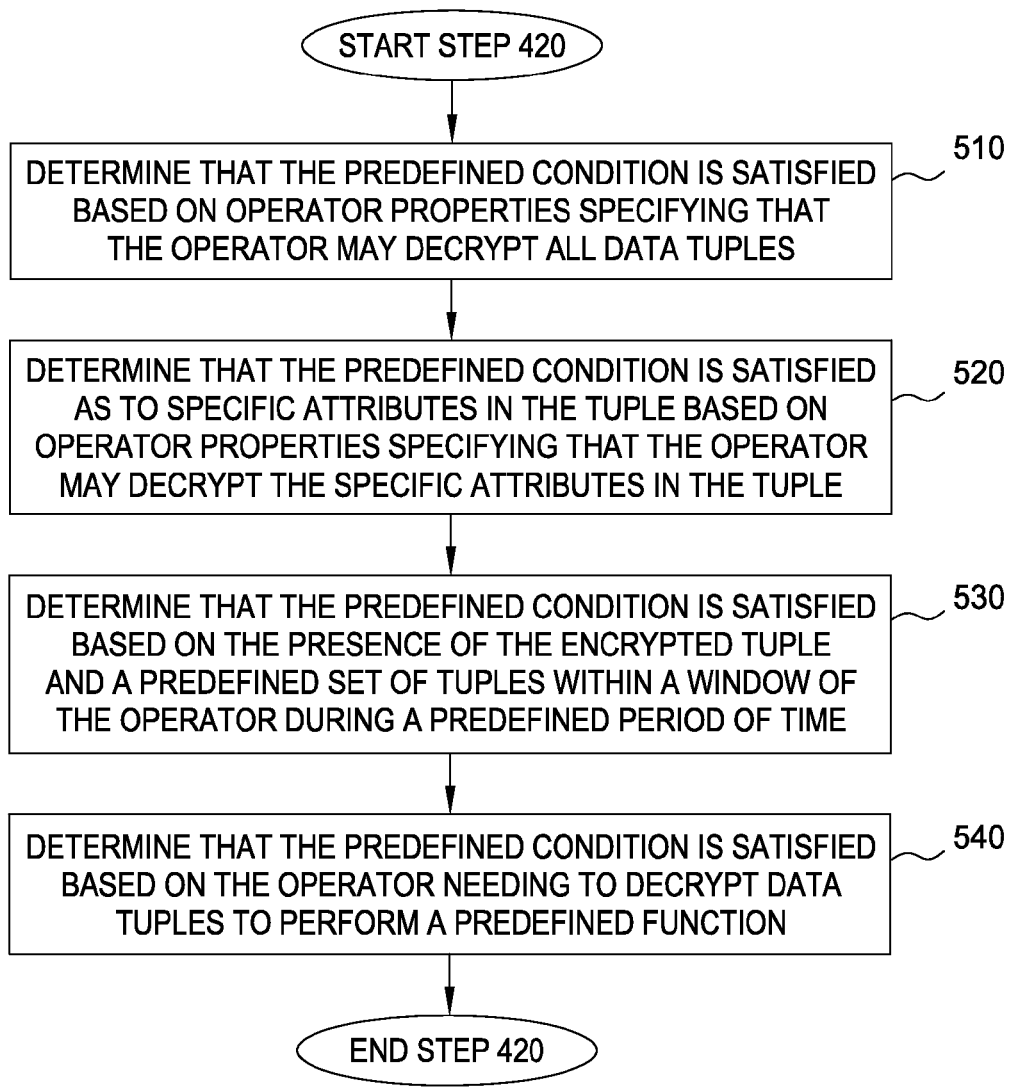
FIG. 5 is a flowchart depicting conditions permitting the decryption of encrypted data, according to one embodiment disclosed herein.

FIG. 5 is a flowchart depicting a method 500 corresponding to step 420 for determining whether an operator may decrypt encrypted data, according to one embodiment disclosed herein. Although depicted as a flowchart, one, several, or all of the steps of the method 500 may be referenced to determine whether the operator may decrypt encrypted data. In some embodiments, the encryption manager 333 performs the steps of the method 500. At each step, the encryption manager 333 determines whether the operator's properties have been defined to allow decryption of encrypted data. If such properties exist, the encryption manager 333 may determine that a predefined condition is satisfied, and the decryption may occur as defined in the operator properties. In some embodiments, the predefined condition may be the existence of operator properties permitting decryption. In other embodiments, the predefined condition may be attributes within a tuple setting rules for encrypted attributes. At step 510, the encryption manager 333 determines whether the predefined condition is satisfied based on operator properties specifying that the operator may decrypt all encrypted data attributes in all tuples. In such cases, the operator properties may permit decryption of any type of encrypted data, for any purpose. At step 520, the encryption manager 333 determines that the predefined condition is satisfied as to specific attributes in the tuple based on operator properties specifying that the operator may decrypt specific, enumerated tuple attributes. For example, a medical records data tuple may include encrypted attributes for a patient's social security number (SSN) and medical diagnosis. The operator properties may specify that the operatory can decrypt the SSN attribute, but not the medical diagnosis attribute. Alternatively, the operator properties may specify that the operator may decrypt the medical diagnosis attribute, but not the SSN attribute. For example, it may not be necessary to decrypt a patient's SSN in order to determine that the patient has a particular medical diagnosis. Therefore, in some embodiments, an operator property may be defined such that the operator can decrypt specific attributes, but leave other attributes encrypted.

At step 530, the encryption manager 333 determines whether the predefined condition is satisfied based on the presence of the encrypted tuple and a set of predefined tuples within a window of the operator. A window may be defined as a group of tuples received at the operator for processing. Thus, an operator may have a windowing condition which examines encrypted data tuples. The operator may be configured to only decrypt encrypted attributes of a set of data tuples if that set (or another set) of data tuples are in the window at the same time. This allows decrypted data to be sent through the operator graph while only providing access to the operators that are allowed to use it. Thus, if the encryption manager 333 determines that the operator has a windowing condition which permits decryption if tuples A, B, and C are present in the operator, and the encryption manager 333 determines that tuples A, B, and C are present in the operator, encrypted tuples may be decrypted within the operator. An example of such a windowing condition is provided in FIG. 8, described in further detail below. At step 540, the encryption manager 333 determines whether the predefined condition is satisfied based on the operator decrypting data tuples to perform a predefined function. Operator properties may be set by the encryption manager 333 to permit decryption only to perform a specified function. Examples of such functions include, but are not limited to, decrypting data tuples to perform a join; decrypting data tuples to perform windowing operations (or any other internal operations); decrypting data tuples to perform grouping within an aggregate function; and decrypting data tuples to perform a sort. For example, the encryption manager 333 may determine that an operator is requesting to decrypt tuples in order to perform a join operation on tuples from two different data streams. If the encryption manager 333 determines that such decryption is permitted in the operator properties, the predefined condition is satisfied, and the tuples may be decrypted for this limited purpose. Operators which are designed to make decisions based on encrypted attributes, such as in the join example given above, may be designed in such a way that tuples are emitted only when a certain quantity of results are produced so as to maintain anonymity of the results. This would prevent a case where too few inputs are fed into the operator to adequately protect the anonymous nature of the data. A threshold for a minimum number of results may be predefined by the encryption manager 333, or by a user.

Figure 6:
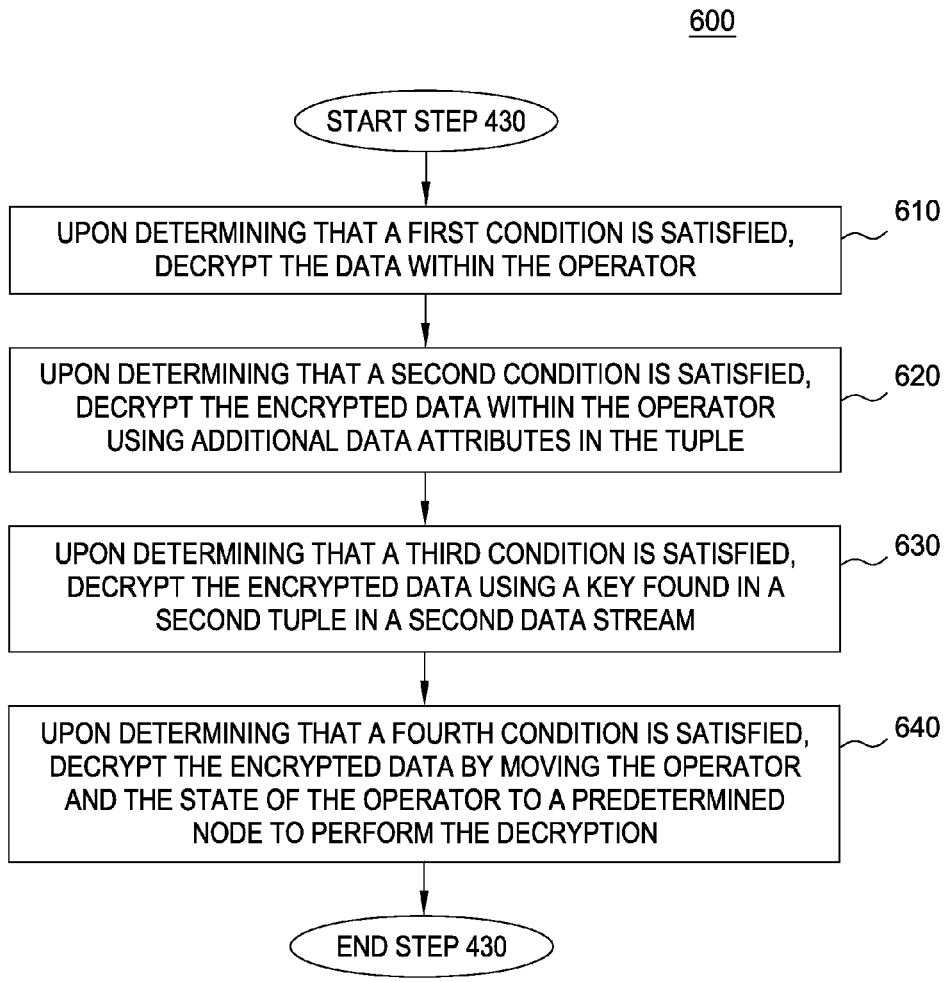
FIG. 6 is a flowchart depicting methods of decrypting encrypted data, according to one embodiment disclosed herein.

FIG. 6 is a flowchart depicting a method 600 corresponding to step 430 for decrypting encrypted data, according to one embodiment disclosed herein. In some embodiments, the encryption manager 333 performs the steps of the method 600. The method 600 identifies a number of different methods for decrypting data within an operator. Generally speaking, the encryption manager 333 may use any decryption algorithm to decrypt encrypted data found in a tuple. Although depicted as a flowchart, one, several, or all of the steps of the method 600 may be referenced to determine a method used to decrypt encrypted data within an operator. At step 610, the encryption manager 333 decrypts the encrypted data within the operator upon determining that a first condition is satisfied. In some embodiments, the first condition is the existence of an operator property specifying that the operator may decrypt the encrypted data. At step 620, the encryption manager 333, upon determining that a second condition is satisfied, decrypts the encrypted data within the operator using unencrypted data attributes in the tuple. In some embodiments, the second condition is an operator property specifying that specific encrypted tuples may be decrypted by specific tuples that contain unencrypted data which may be used as input in a decryption algorithm. In such an embodiment, the encryption manager 333 uses the unencrypted data and a general purpose decryption algorithm to decrypt an encrypted data tuple. By operating in such a fashion, tuples may travel through the operator graph and be used only by the operators that have access to read them. An example would be sending medical records over the operator graph, but only those studies having access to them are able to extract the data required for the study. These operators can then make a business decision that does not need to be encrypted from encrypted data. At step 630, the encryption manager 333, upon determining that a third condition is satisfied, decrypts the encrypted data using a key found in a second tuple in a second data stream. In some embodiments, the third condition is an operator property specifying that the decryption key may be found in a second tuple in a second data stream. In such embodiments, the decryption key flows into the operator from a second data stream. The encryption manager 333, upon retrieving this key, may use it as input into the decryption algorithm internal to the operator to decrypt the encrypted data. At step 640, the encryption manager 333, upon determining a fourth condition is satisfied, decrypts the encrypted data by moving the operator and the state of the operator to a predetermined node to perform the decryption. In some embodiments, the fourth condition may be operator properties which indicate that decryption (by any method) cannot be performed on the node on which the operator currently resides. Therefore, the encryption manager 333 may move the encrypted data to a predetermined node where the decryption will be performed. Alternatively, the operator and the state of the operator may be moved to a given node to perform the decryption. In another embodiment, the stream manager 134 may only schedule processing elements containing operators with special decrypting attributes to run on specific nodes. In still other embodiments, operators may be fused or unfused based on encryption attributes.

Figure 7:
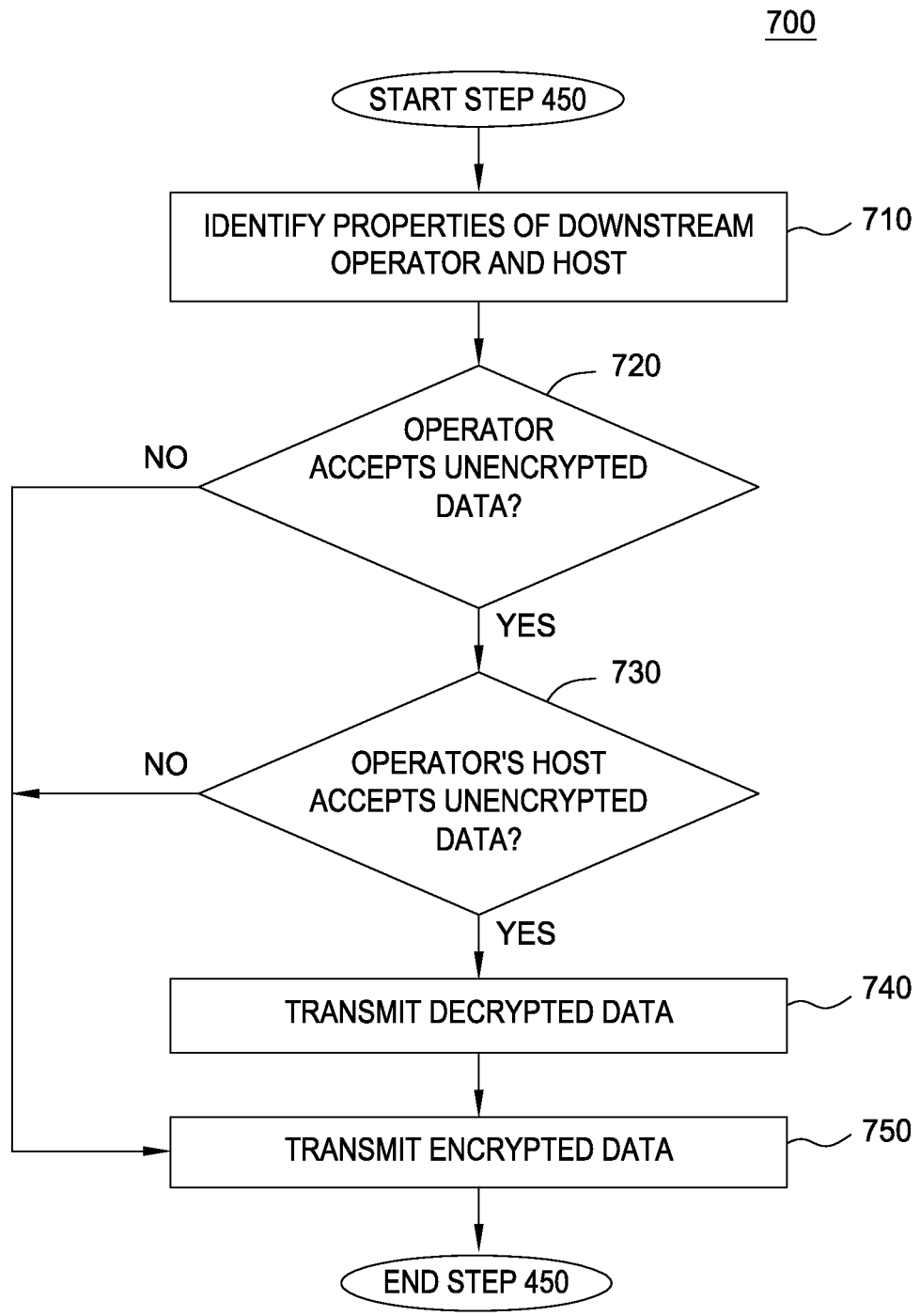
FIG. 7 is a flowchart depicting a method for transmitting data, according to one embodiment disclosed herein.

FIG. 7 is a flowchart depicting a method 700 corresponding to step 450 for transmitting data tuples, according to one embodiment disclosed herein. The operator-level privacy measures disclosed herein would be incomplete if an operator transmitted decrypted data to vulnerable nodes and operators. Therefore, the encryption manager 333 must determine whether the operator can output decrypted data, whether it must output encrypted data, or both, depending on the downstream operators. In some embodiments, the encryption manager 333 performs the steps of the method 700. At step 710, the encryption manager 333 identifies the properties of the operator and host which are downstream from the current operator. Examples of operator and host properties include, but are not limited to, the ability to accept encrypted data, the ability to decrypt encrypted data, the ability to encrypt unencrypted data, and the ability to transmit encrypted or unencrypted data. While the method 700 is focused on the properties of the downstream operator and host, alternate embodiments may identify properties of the current operator and host, and whether that operator and host may transmit encrypted or unencrypted data. At step 720, the encryption manager 333 determines whether the downstream operator can accept unencrypted data. If the downstream operator can accept unencrypted data, the encryption manager 333 proceeds to step 730. If the downstream operator cannot accept unencrypted data, the encryption manager proceeds to step 750. At step 730, the encryption manager 333 determines whether the operator's host can accept unencrypted data. If the downstream host can receive unencrypted data, the encryption manager 333 proceeds to step 740. If the downstream host cannot receive unencrypted data, the encryption manager proceeds to step 750. At step 740, the encryption manager may determine to transmit decrypted data to the downstream operator. In some embodiments, although unencrypted data may be transmitted, the encryption manager may decide to transmit encrypted data to provide additional security. At step 750, the encryption manager 333 transmits encrypted data to the downstream operator.

Figure 8:
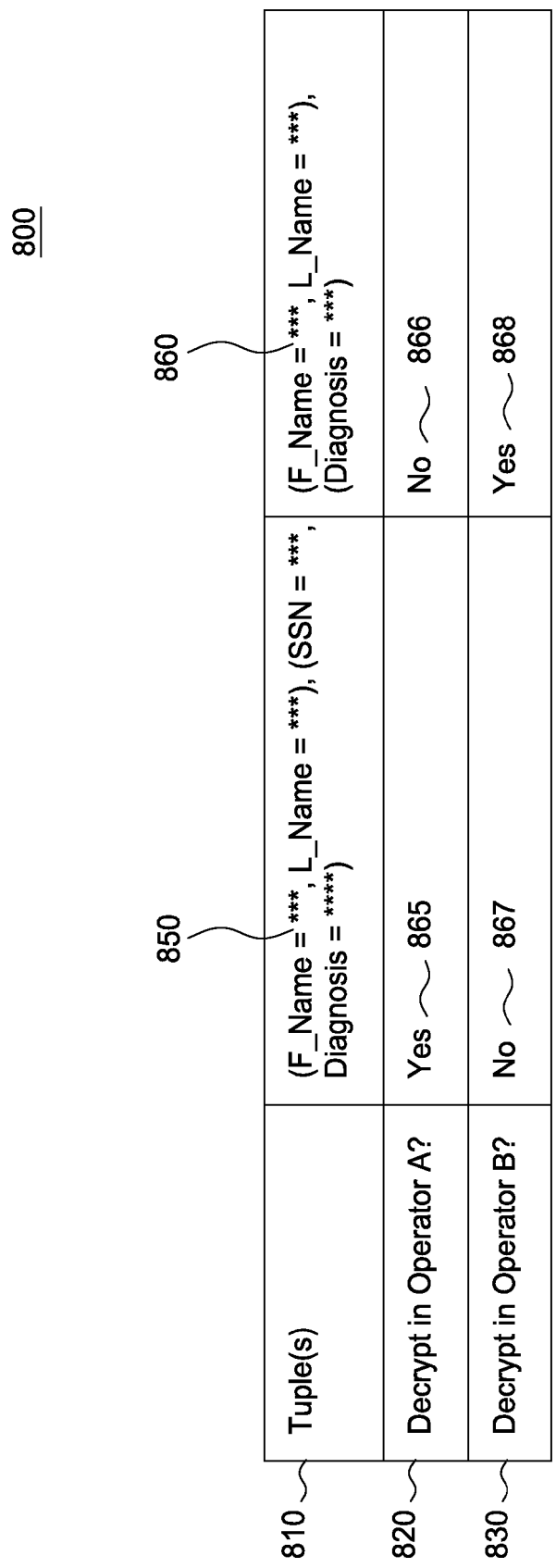
FIG. 8 illustrates a table indicating whether a tuples containing encrypted data will be decrypted within an operator, according to one embodiment described herein.

FIG. 8 illustrates a table 800 indicating whether a tuples containing encrypted data will be decrypted within an operator, according to one embodiment described herein. The table 800 is associated with the windowing condition described above with reference to step 530 of FIG. 5. The table 800 has as row elements 810, 820, and 830, corresponding to "Tuple (s)", "Decrypt in Operator A", and "Decrypt in Operator B." Therefore, based on a given set of tuples, the table will indicate whether the windowing condition is met with respect to operators A and B, and whether the tuples will be decrypted within the operator. The tuples in elements 850 and 860 are exemplary windows of tuples within an operator at a given time. Therefore, element 850 indicates two tuples each having two attributes. The first tuple has attributes F_Name (corresponding to first name) and L_Name (corresponding to last name), and the second tuple has attributes SSN and Diagnosis. Each attribute having encrypted values is denoted by the series of *s. Element 860 contains two tuples, the first tuple having F_Name and L_Name attributes, and the second tuple having the Diagnosis attribute. In element 865, the table reflects that the encrypted attributes in element 850 may be decrypted in operator A, because a windowing condition is satisfied. The condition may be, for example, that two tuples in the window have attributes containing information related to the same person for decryption to take place. Because element 850 contains two tuples with information which can be related to the same person, the encrypted attributes are decrypted. In element 866, the tuples in element 860 will not be decrypted by operator A, as the windowing condition has not been met, since the two tuples do not have information related to the same person, as the diagnosis may be for any given individual. With respect to element 867, operator B will decrypt the encrypted attributes in element 850, as the windowing condition has been satisfied. For example, the windowing condition in operator B may specify that decryption will occur only when the F_Name, L_Name, and SSN attributes are present in the window. As indicated in element 868, Operator B will not decrypt the attributes of the tuples in element 860, as the SSN attribute is not present.

Furthermore, although embodiments of the present disclosure are described within the context of a stream computing application, this is not the only context relevant to the present disclosure. Instead, such a description is without limitation and is for illustrative purposes only. Of course, one of ordinary skill in the art will recognize that embodiments of the present disclosure may be configured to operate with any computer system or application capable of performing the functions described herein. For example, embodiments of the disclosure may be configured to operate in a clustered environment with a standard database processing application.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A non-transitory computer program product, comprising:
 a computer-readable storage medium having computer-readable program code embodied therewith, the computer-readable program code comprising:
 computer-readable program code configured to provide a plurality of processing elements comprising one or more operators, the operators configured to process streaming data tuples by operation of one or more computer processors;

computer-readable program code configured to define attributes of the operators, wherein the attributes comprise at least an access indicator defining processing rules for tuples containing encrypted data;

computer-readable program code configured to establish an operator graph of a plurality of operators, the operator graph defining at least one execution path in which a first operator of the plurality of operators is configured to receive data tuples from at least one upstream operator and transmit data tuples to at least one downstream operator;

computer-readable program code configured to, upon receiving a first data stream having a first tuple containing encrypted data in the first operator, determine, based on the access indicator of the first operator, whether to decrypt the encrypted data in the first operator;

computer-readable program code configured to, upon determining that the access indicator of the first operator permits decryption of the encrypted data based on a windowing condition existing within the first operator, decrypt the encrypted data, wherein the windowing condition is defined by the presence of both the first tuple and a predefined set of tuples within a window of the first operator during a predefined period of time; and computer-readable program code configured to transmit the first tuple to a second operator, downstream from the first operator.

2. The non-transitory computer program product of claim 1, wherein the processing rules of the access indicator further comprise at least one of:

ignoring, in the operator, tuples that contain encrypted data, wherein ignoring the tuple indicates that the encrypted data is not decrypted;

ignoring, in the operator, tuples that contain encrypted data in predefined attributes, wherein ignoring the tuple indicates that the encrypted data in the predefined attributes is not decrypted;

decrypting, in the operator, encrypted data within a tuple; and decrypting, in the operator, encrypted data for a limited purpose.

3. The non-transitory computer program product of claim 2, wherein the limited purpose comprises at least one of:

decrypting to perform a join operation on at least a first tuple and a second tuple; decrypting to perform a windowing operation; decrypting to perform grouping within an aggregate function; and decrypting to perform a sort.

4. The non-transitory computer program product of claim 1, wherein decrypting the encrypted data comprises at least one of:

decrypting the encrypted data within the operator;
decrypting the encrypted data by moving the operator and the state of the operator to a predetermined node to perform the decryption;
decrypting the encrypted data using a second data in the first tuple; and decrypting the encrypted data using a key from a second tuple in a second data stream.

5. The non-transitory computer program product of claim 1, wherein transmitting the first tuple comprises:

upon determining the access indicator of the second operator does not permit the second operator to receive unencrypted data, transmitting the encrypted data to the second operator;

upon determining the access indicator of the second operator permits the second operator to receive unencrypted data, transmitting the decrypted data to the second operator;

upon determining that a computing system hosting the processing element containing the second operator is not permitted to receive unencrypted data, transmitting the encrypted data to the second operator; and upon determining that a computing system hosting the processing element containing the second operator is permitted to receive unencrypted data, transmitting the decrypted data to the second operator.

6. The non-transitory computer program product of claim 1, wherein the first tuple is transmitted upon determining that the number of tuples received in the first operator exceed a predefined threshold.

7. A system, comprising:

one or more computer processors; and a memory containing a program, which when executed by the one or more computer processors is configured to perform an operation, the operation comprising:

providing a plurality of processing elements comprising one or more operators, the operators configured to process streaming data tuples by operation of one or more computer processors;

defining attributes of the operators, wherein the attributes comprise at least an access indicator defining processing rules for tuples containing encrypted data;

establishing an operator graph of a plurality of operators, the operator graph defining at least one execution path in which a first operator of the plurality of operators is configured to receive data tuples from at least one upstream operator and transmit data tuples to at least one downstream operator;

upon receiving a first data stream having a first tuple containing encrypted data in the first operator, determining, based on the access indicator of the first operator, whether to decrypt the encrypted data in the first operator;

upon determining the access indicator of the first operator permits decryption of the encrypted data, decrypting the encrypted data; and transmitting the first tuple to a second operator, downstream from the first operator, wherein transmitting the first tuple comprises:

upon determining that a computing system hosting the processing element containing the second operator is not permitted to receive unencrypted data, transmitting the encrypted data to the second operator; and upon determining that a computing system hosting the processing element containing the second operator is permitted to receive unencrypted data, transmitting the decrypted data to the second operator.

8. The system of claim 7, wherein the processing rules of the access indicator comprise at least one of:

ignoring, in the operator, tuples that contain encrypted data, wherein ignoring the tuple indicates that the encrypted data is not decrypted;

ignoring, in the operator, tuples that contain encrypted data in predefined attributes, wherein ignoring the tuple indicates that the encrypted data in the predefined attributes is not decrypted;

decrypting, in the operator, encrypted data within a tuple;

upon determining a windowing condition exists within the operator, decrypting, in the operator, encrypted data within a tuple; and decrypting, in the operator, encrypted data for a limited purpose.

9. The system of claim 8, wherein the windowing condition is defined by the presence of both the encrypted tuple and a predefined set of tuples within a window of the operator during a predefined period of time.

10. The system of claim 8, wherein the limited purpose comprises at least one of:

decrypting to perform a join operation on at least a first tuple and a second tuple;

decrypting to perform a windowing operation;

decrypting to perform grouping within an aggregate function; and decrypting to perform a sort.

11. The system of claim 7, wherein decrypting the encrypted data comprises at least one of:

decrypting the encrypted data within the operator;

decrypting the encrypted data by moving the operator and the state of the operator to a predetermined node to perform the decryption;

decrypting the encrypted data using a second data in the first tuple; and decrypting the encrypted data using a key from a second tuple in a second data stream.

12. The system of claim 7, wherein transmitting the first tuple further comprises:

upon determining the access indicator of the second operator does not permit the second operator to receive unencrypted data, transmitting the encrypted data to the second operator; and upon determining the access indicator of the second operator permits the second operator to receive unencrypted data, transmitting the decrypted data to the second operator.

13. The system of claim 7, wherein the first tuple is transmitted upon determining that the number of tuples received in the first operator exceed a predefined threshold.

14. A non-transitory computer program product, comprising:

a computer-readable storage medium having computer-readable program code embodied therewith, the computer-readable program code comprising:

computer-readable program code configured to provide a plurality of processing elements comprising one or more operators, the operators configured to process streaming data tuples by operation of one or more computer processors;

computer-readable program code configured to define attributes of the operators, wherein the attributes comprise at least an access indicator defining processing rules for tuples containing encrypted data;

computer-readable program code configured to establish an operator graph of a plurality of operators, the operator graph defining at least one execution path in which a first operator of the plurality of operators is configured to receive data tuples from at least one upstream operator and transmit data tuples to at least one downstream operator;

computer-readable program code configured to, upon receiving a first data stream having a first tuple containing encrypted data in the first operator, determine, based on the access indicator of the first operator, whether to decrypt the encrypted data in the first operator;

computer-readable program code configured to, upon determining the access indicator of the first operator permits decryption of the encrypted data, decrypt the encrypted data; and computer-readable program code configured to transmit the first tuple to a second operator, downstream from the first operator, wherein transmitting the first tuple comprises:

upon determining the access indicator of the second operator does not permit the second operator to receive unencrypted data, transmitting the encrypted data to the second operator; and upon determining the access indicator of the second operator permits the second operator to receive unencrypted data, transmitting the decrypted data to the second operator.

* * * * *